United States Patent
Yoshida et al.

(10) Patent No.: US 12,078,733 B2
(45) Date of Patent: Sep. 3, 2024

(54) NAVIGATION SATELLITE SYSTEM RECEPTION DEVICE, METHOD FOR PROCESSING NAVIGATION SATELLITE SIGNAL FROM SAME, AND PROGRAM

(71) Applicant: Nippon Telegraph and Telephone Corporation, Tokyo (JP)

(72) Inventors: Seiji Yoshida, Tokyo (JP); Masakatsu Fujiwara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/118,503

(22) Filed: Mar. 7, 2023

(65) Prior Publication Data
US 2023/0251388 A1     Aug. 10, 2023

Related U.S. Application Data

(63) Continuation of application No. 17/257,922, filed as application No. PCT/JP2019/027537 on Jul. 11, 2019, now abandoned.

(30) Foreign Application Priority Data

Jul. 13, 2018 (JP) ................. 2018-133069

(51) Int. Cl.
G01S 19/22     (2010.01)
G01S 19/28     (2010.01)
G01S 19/35     (2010.01)

(52) U.S. Cl.
CPC .............. *G01S 19/22* (2013.01); *G01S 19/28* (2013.01); *G01S 19/35* (2013.01)

(58) Field of Classification Search
CPC .......... G01S 19/21; G01S 19/28; G01S 19/35; G04R 20/00
See application file for complete search history.

(56) References Cited

U.S. PATENT DOCUMENTS 7,400,956 B1    7/2008  Feller et al.
2002/0084941 A1  7/2002  Matz et al.
(Continued)

FOREIGN PATENT DOCUMENTS

JP    H06-213999    8/1994
JP    2001-289652   10/2001
(Continued)

OTHER PUBLICATIONS

Defintion for heading. (2011). The American Heritage Dictionary of the English Language. Boston, MA: Houghton Mifflin. Retrieved from http://search.credoreference.com/content/entry/hmdictenglang/heading/0 (Year: 2011).*

(Continued)

*Primary Examiner* — Bernarr E Gregory
*Assistant Examiner* — Fred H Mull
(74) *Attorney, Agent, or Firm* — Fish & Richardson P.C.

(57) ABSTRACT

A navigation satellite system reception apparatus can eliminate multipath signals without direct waves of invisible satellites and can implement time synchronization. A satellite orbit information acquisition unit acquires orbit information of a satellite, an installation position information acquisition unit acquires position information of an installation position, an azimuth meter acquires azimuth information of an azimuth in which a wall surface of a nearby obstruction extends, and an azimuth mask generation unit calculates a mask region for selecting a satellite to be a target of processing based on the azimuth information. A positioning and time synchronization processing unit calculates an azimuth and an angle of elevation of each satellite, selects a satellite to be a target of processing bas, and performs the positioning processing or the time synchronization processing based on a satellite signal received from the selected satellite.

5 Claims, 18 Drawing Sheets

(56) References Cited

U.S. PATENT DOCUMENTS

| 2008/0166011 | A1 | 7/2008 | Sever et al. |
| 2010/0176992 | A1 | 7/2010 | T'siobbel |
| 2010/0201568 | A1 | 8/2010 | Han et al. |
| 2014/0266884 | A1 | 9/2014 | Raghupathy et al. |
| 2017/0003395 | A1 | 1/2017 | Sasaki et al. |

FOREIGN PATENT DOCUMENTS

| JP | 2006-47218 | 2/2006 |
| JP | 2009-288131 | 12/2009 |
| JP | 2010-534849 | 11/2010 |

OTHER PUBLICATIONS

Kubo, "A Study on GPS Multipath Mitigation and its Practicability for High Precise Positioning," University of Marine Science and Technology, Tokyo, 2005, 593 pages (with English Translation).

Meguro et al., "GPS Multipath Mitigation for Urban Area Using Omnidirectional Infrared Camera," IEEE Transactions Onintelligent Transportation Systems, Mar. 2009, 10(1):22-30.

Nishi et al., "Consideration for precision improvement of GNSS time synchronization in the multipath environment," IEICE, Technical Report, 2016, 17 pages (with English Translation).

Nishi et al., "Improvement of the time synchronization precision by the network-assisted GPS time synchronization systems," IEICE, Technical Report, 2016, 115(406):1-6, 13 pages (with English Translation).

Nishi et al., "Proposals of a Receiving Characteristics Estimation Method for Satellite Signal and an Efficient Installation Technique for GPS Receivers," Proceedings of the IEICE General Conference, 2015, 2:311.

Yoshida et al., "Precision Improvement in GNSS Time Synchronization by mitigating the effect of multipath signals from NLOS satellites," National Conference of Positioning Navigation Society, 2017, 3 pages (with English Translation), (not the complete article).

\* cited by examiner

NAVIGATION SATELLITE SYSTEM RECEPTION DEVICE, METHOD FOR PROCESSING NAVIGATION SATELLITE SIGNAL FROM SAME, AND PROGRAM

CROSS-REFERENCE TO RELATED APPLICATIONS

This application is a Continuation application of U.S. application Ser. No. 17/257,922, filed Jan. 5, 2021 (Abandoned), which is a National Stage application under 35 U.S.C. § 371 of International Application No. PCT/JP2019/027537, having an International Filing Date of Jul. 11, 2019, which claims priority to Japanese Application Serial No. 2018-133069, filed on Jul. 13, 2018. The disclosure of the prior application is considered part of the disclosure of this application, and is incorporated in its entirety into this application.

TECHNICAL FIELD

The present disclosure relates to a technique of implementing time synchronization and positioning with high accuracy even in an environment in which navigation satellite signals of a navigation satellite system cannot be received satisfactorily.

BACKGROUND ART

The Global Navigation Satellite System (GNSS), such as the Global Positioning System (GPS), is used in various applications as a means of enabling implementation of positioning and time synchronization with high accuracy by receiving navigation satellite signals at any point on the earth.

Among mobile communication methods, in a mobile communication method of the Time Division Duplex (TDD) method in which downlink signals sent from a base station toward a terminal and uplink signals sent from a terminal to a base station are multiplexed on a time axis, signal transmission timings need to be synchronized with high accuracy between base stations for reducing interfere of signals. In a Time Division Long Term Evolution (TD-LTE) method being one of the TDD methods, synchronization accuracy between base stations is required to be ±1.5 microseconds or less. As a means of implementing such high time synchronization accuracy, time synchronization by means of the GNSS (hereinafter referred to as GNSS time synchronization), and a time synchronization system implemented by combining a time information distribution network by means of the Precision Time Protocol (PTP) with such a time synchronization have been used.

A mobile base station has a tendency of being located more densely in an area with a large traffic demand. In an urban area, an architecture for increasing planar communication capacity with an arrangement pattern of base stations each referred to as a "small cell", which has a smaller diameter of cell being coverage of a base station, is used. In this case, as reception environments of navigation satellite signals, not only a reception environment referred to as an "open sky" or a "clear sky" without a structure that blocks reception around an antenna (hereinafter a navigation satellite antenna) for receiving navigation satellite signals, but also a reception environment in which an open space in which navigation satellite signals can be received in a line of sight state is limited with a building around the navigation satellite antenna or the like is assumed. In actuality, a base station for a small cell may be installed on a wall surface or at a room window of a building, for example, and securing accuracy of GNSS time synchronization in such a reception environment has been a problem.

Time accuracy required in a system (hereinafter a time synchronization system) that supplies time information for a base station through time information distribution by means of GNSS time synchronization and PTP is defined in International Telecommunication Union Telecommunication Standardization Sector (ITU-T) recommendation G.8271.1. When time accuracy of each node that constitutes such a time synchronization system is measured or evaluated, comparison with a true value of time is necessary. However, when a value close to a true value of time is acquired, navigation satellite signals need to be received in a reception environment close to the open sky and synchronization with Coordinated Universal Time (UTC) is required. However, as described above, in some cases it is difficult to secure an environment in which navigation satellite signals can be satisfactorily received at places near an installation place of a base station. In view of this, the following method is often used: a clock of a time accuracy measurement device including an atomic oscillator made of rubidium or the like is synchronized with navigation satellite signals continuously for several hours or more at a location in a reception environment close to the open sky to be calibrated, and then transferred to a location where measurement is performed. In this case, accuracy of the clock of the measurement device deteriorates over time along with free running of the atomic oscillator. Thus, to secure necessary measurement accuracy, time required for the transfer and the measurement operation is limited. For this reason, it is necessary to planarly deploy a location (calibration location) for performing calibration of the measurement device near a location (measurement location) for performing measurement. This causes a significant problem in terms of facilities and running costs.

The orbit of a navigation satellite is managed with high accuracy by a control unit on the ground, and a navigation satellite includes a high-accuracy atomic clock synchronized with Coordinated Universal Time and transmits navigation satellite signals based on the Coordinated Universal Time. Accordingly, by simultaneously receiving navigation satellite signals of four or more satellites at any point on the earth, four parameters, that is, three-dimensional coordinate information (x, y, z) of a reception position and a time difference ($\Delta t$) between each satellite and the navigation satellite signal reception apparatus, can be calculated. In other words, positioning and time synchronization using navigation satellite signals can be performed.

When positioning using navigation satellite signals or time synchronization with navigation satellite signals is performed, to enhance accuracy, it is effective to select a reception environment with a wide open space in which a larger number of receivable satellite (hereinafter visible satellite) signals can be received as direct waves. In addition, a larger number of visible satellites located in a distributed manner all over the sky leads to further enhancement of accuracy of positioning and time synchronization. As an index representing deterioration of accuracy due to imbalanced arrangement of satellites in the sky, an index referred to as Dilution Of Precision (DOP) (a rate of deterioration of accuracy) is in many cases used. Due to limitation of the open space in the sky with a building, a tree, or the like around the reception position of the navigation satellite signal, the number of signals of visible satellites that can be received in the line of sight state is limited, and accuracy is deteriorated due to imbalanced positions of visible satellites in the sky.

Examples of main factors that affect accuracy other than those described above in positioning and time synchronization using navigation satellite signals include a case in which reception of reflected waves and diffracted waves (so-called multipath signals) of navigation satellite signals that are generated by reflection and diffraction due to a structure or the ground around a reception position. FIG. 16 is a schematic diagram for describing an occurrence state of multipath signals. As illustrated in FIG. 16, types of multipath signals include a case with direct waves (multipath signal of visible satellite signals) and a case without direct waves (multipath signals of satellite (hereinafter invisible satellite) signals that cannot be received in the line of sight state). Regarding multipath signals with direct waves of visible satellites in the former case, received strength of direct waves is usually higher than received strength of multipath signals. Thus, measures to effectively reduce influence of multipath signals through correlation signal processing in the navigation satellite signal reception apparatus have hitherto been studied (see NPL 1). In contrast, regarding multipath signals without direct waves of invisible satellites in the latter case, it is difficult to remove influence except when the navigation satellite signals from the invisible satellites are not used for positioning and time synchronization, and thus has significant influence on positioning accuracy and time synchronization accuracy.

FIGS. 17 and 18 each show an example of a reception state of multipath signals. As a result of receiving GPS satellite signals in an environment surrounded by buildings as illustrated in FIG. 17, as illustrated in the upper part of FIG. 18, it is confirmed that many invisible satellite signals blocked by the structures (in the example of FIG. 18, #2, #3, #5, #7, #12, #17, #19, #23, and #25) are received as multipath signals, in addition to visible satellite signals (in the example of FIG. 18, #6 and #9) that are located in the open space in the skyward image at the GPS antenna installation position. As illustrated in the lower part of FIG. 18, regarding reception characteristics of GPS satellite signals over time as well, GPS satellite signals whose number is closer to the number of receiving satellites presupposing the open sky than the number of visible satellites that can be obtained through simulation from the open space in consideration of structures around the GPS antenna are received.

The multipath signals have a longer propagation path length in comparison with direct waves and reach the navigation satellite antenna with a propagation delay. Thus, by receiving multipath signals without direct waves of invisible satellites, significant errors of pseudo-distance measurement are caused, and positioning accuracy and time synchronization accuracy are deteriorated. Here, the pseudo-distance refers to a distance obtained by multiplying a difference between the transmission time of the navigation satellite signals and the time of receiving the navigation satellite signals by using the navigation satellite signal reception apparatus by the light speed.

FIG. 19 illustrates a configuration of an experimental system used to measure a difference (time errors) between time that is obtained by receiving GPS satellite signals in an environment of FIGS. 17 and 18 in which multipath signals are caused and time that is obtained by receiving GPS satellite signals in an nearby open sky environment. The GPS satellite signals received in respective environments are input to two GPS receivers of the same type respectively, and a phase difference of one Pulse Per Second (PPS) signals being timing output signals of time information being generated are measured over time with a time error measurement device. As a result, as shown by the data plotted in the lower part of FIG. 20, it is confirmed that time that is generated from GPS satellite signals received in an environment in which multipath signals are caused is behind time that is generated from GPS satellite signals received in an open sky environment by at the maximum of 250 ns or more.

Various methods for reducing influence caused by such multipath signals have hitherto been considered (see NPL 2).

One method for reducing the influence of multipath signals will be described. The signal strength of multipath signals is attenuated when navigation satellite signals are reflected or diffracted with a building. A gyration direction of circularly polarized wave characteristics of navigation satellite signals is inverted at the time of reflection with a building or the like. By providing isolation characteristics dependent on the circularly polarized wave characteristics in the navigation satellite antenna with the use of the inversion of the circularly polarized wave characteristics due to the reflection, signal strength of reflected waves that are reflected an odd number of times can be attenuated. Signal strength of reflected waves from the ground or a low angle of elevation can be attenuated with directivity of a vertically upward direction of the navigation satellite antenna. The above is one method of reducing influence of multipath signals owing to the navigation satellite antenna.

Examples of other methods of reducing influence of multipath signals that is implemented in the navigation satellite signal reception apparatus include a method of relatively performing weighting processing on navigation satellite signals used at the time of performing positioning or time synchronization by using received strength or a signal-to-noise ratio (SNR) of received navigation satellite signals, and a method of selecting navigation satellite signals to be used for positioning and time synchronization by a threshold of received strength or a signal-to-noise ratio (SNR) of received navigation satellite signals. The method of the latter case is referred to as an SNR mask. FIG. 20 shows results of measuring time accuracy when navigation satellite signals are selected by using a threshold of a signal-to-noise ratio (SNR). As shown in FIG. 20, as a result of generating time by selecting GPS satellite signals having a carrier-to-noise ratio (CNR), which is one index of a signal-to-noise ratio (SNR), of 35 dB-Hz or more out of GPS satellite signals received in the measurement in the system of FIG. 19, it is confirmed that time errors are significantly improved to less than 100 ns.

In addition, another method of reducing influence of multipath signals that is implemented in the navigation satellite signal reception apparatus will be described. As illustrated in FIG. 21, an occurrence state of multipath signals depends on an angle of elevation of navigation satellite signals. Because the height of a building around the navigation satellite antenna that causes reflection and diffraction is limited, when a distance between the building and the installation position of the navigation satellite antenna is large, an angle of reflection at the wall surface in the vertical direction of the building is small regarding reflected signals of navigation satellite signals having a large angle of elevation. Thus, the reflected signals propagate toward the ground, and do not reach the navigation satellite antenna. In contrast, navigation satellite signals having a small angle of elevation have a large angle of reflection at the wall surface in the vertical direction of the building. Thus, it is likely that reflected waves with a larger propagation delay time difference in comparison with direct waves reach the navigation satellite antenna. For this reason, a countermeasure of reducing the influence of multipath signals by filtering navigation satellite signals by using a threshold of an angle of elevation and selecting navigation satellite signals to be used for positioning and time synchronization has hitherto been implemented. This method is referred to as an angle of elevation mask. FIG. 22 shows results of measurement of time accuracy when GPS satellite signals are selected by using a threshold of an angle of elevation in the reception environment of FIG. 17. As shown in FIG. 22, it is confirmed that time errors are improved along with an increase of the threshold of an angle of elevation.

Another method of reducing influence of multipath signals that is implemented in the navigation satellite signal reception apparatus is a method of preliminarily performing positioning and time synchronization arithmetic using a combination of navigation satellite signals of a subset of received navigation satellite signals, and selecting navigation satellite signals through statistic processing. In an air traffic control system or the like, to secure integrity of the navigation satellite system, a method referred to as Receiver Autonomous Integrity Monitoring (RAIM) for detecting navigation satellite signals not in a normal operation state through statistic signal processing and a method referred to as Fault Detection and Exclusion (FDE) of performing elimination in addition to detection are performed. There has been a study on a method of improving time synchronization accuracy by using a method of preferentially selecting visible satellite signals through similar statistic processing that focuses on the fact that multipath signals reach the navigation satellite antenna later than direct waves, and if the number of visible satellites is less than four, complementarily selecting invisible satellite signals having small propagation delay time (see NPL 3).

CITATION LIST

Non Patent Literature

NPL 1: Nobuaki Kubo, "A Study on GPS Multipath Mitigation and its Practicability for High Precise Positioning", doctoral thesis, Tokyo University of Marine Science and Technology, 2005
NPL 2: Keisuke Nishi, "Consideration for precision improvement of GNSS time synchronization in the multipath environment", The Institute of Electronics, Information and Communication Engineers, technological research report, 2016
NPL 3: Seiji Yoshida et al., "Improvement of GNSS Time Synchronization Accuracy with Reduced Influence of Multipath Signals of Invisible Satellites", The Institute of Positioning, Navigation and Timing of Japan National Convention, 2017

SUMMARY OF THE INVENTION

Technical Problem

As described above, when time synchronization accuracy is measured, the method of synchronizing a clock of a time accuracy measurement device including an atomic oscillator with navigation satellite signals for a long period of time at a calibration location of a reception environment in the open sky, calibrated, and is then transferred to a measurement location at which a measured object such as a node of a time synchronization system and a base station is installed has a problem in terms of facilities and running costs, and is difficult to be used in operation management of a time synchronization system configured by a large number of planarly distributed nodes and base stations. In contrast, the method of calibrating an embedded clock by synchronizing a time accuracy measurement device with navigation satellite signals at a measurement location is advantageous in terms of facilities and running costs, but is liable to cause reflection and diffraction of navigation satellite signals due to a structure around the reception position, and causes a problem of deteriorating accuracy due to the influence of multipath signals of invisible satellites.

Below are some examples of problems in the conventional methods of reducing deterioration of accuracy caused in a case of receiving multipath signals without direct waves of invisible satellites in positioning and time synchronization of navigation satellite signals.
(1) Method of Performing Selection of Navigation Satellite Signal in Navigation Satellite Signal Reception Apparatus
(1-1) Method Using Angle of Elevation Mask With a method using an angle of elevation mask of setting a threshold of an angle of elevation of navigation satellite signals and selecting navigation satellite signals to be used for positioning and time synchronization based on the threshold has a higher effect of application in a case that the open space has a shape close to a circle with the center being the zenith. However, in other general reception environments, this method may eliminate even visible satellite signals that originally contribute to enhancement of positioning and time synchronization accuracy. For example, in the reception environment of FIG. 22, when the angle of elevation threshold is set to 40 degrees, visible satellite signals of the visible satellite located east in an open space are eliminated. For this reason, in some cases, selection of navigation satellite signals to be used may not be appropriately performed. When a set value of a threshold is strict (when a threshold of an angle of elevation is large), the number of navigation satellite signals necessary for positioning and time synchronization may not be temporarily secured. In contrast, when a set value of a threshold is loose (when a threshold of an angle of elevation is small), invisible satellite signals received as multipath signals without direct waves cannot be sufficiently eliminated, and accuracy may thus be deteriorated.
(1-2) Method Using SNR Mask With a method using an SNR mask of setting a threshold to received signal strength, a signal-to-noise ratio, or the like of received navigation satellite signals and selecting navigation satellite signals to be used for positioning and time synchronization, an optimal threshold depends on states such as reception characteristics of the navigation satellite antenna, an installation environment of the navigation satellite antenna, sensitivity of the navigation satellite signal reception apparatus, an angle of elevation of the navigation satellites, and overlap of interference signals. In particular, interference signals may cause the signal-to-noise ratio of navigation satellite signals to vary over time. Interference signals may include jamming signals that are intentionally transmitted for the purpose of hindering reception of navigation satellite signals, signals to be used in mobile communication, or the like, and these interference signals cause the signal-to-noise ratio of navigation satellite signals to vary over time when a positional relationship between an interference signal source and a navigation satellite antenna or strength itself of interference signals vary over time.

In the SNR mask method, when a set value of a threshold is strict (when a threshold of received signal strength, a signal-to-noise ratio, or the like is large), the number of navigation satellite signals necessary for positioning and time synchronization may not be temporarily secured in a time span when the number of receivable visible satellite signals is reduced, for example. In contrast, when a set value of a threshold is loose (when a threshold of received signal strength, a signal-to-noise ratio, or the like is small), invisible satellite signals received as multipath signals without direct waves cannot be sufficiently eliminated, and accuracy may be deteriorated.

As described above, in the method using an SNR mask, when a level of overlapping interference signals varies over time, it is not necessarily easy to set an optimal threshold, and selection of navigation satellite signals appropriate for the use of positioning and time synchronization and navigation satellite signals inappropriate for the use of positioning and time synchronization therefor may not be correctly performed.

(2) Method of Receiving Navigation Satellite Signals and then Performing Correction Processing in Navigation Satellite Signal Reception Apparatus (2-1) Method Using Weighting Based on SNR In a method of using weighting at the time of signal processing on satellite signals to be used for positioning and time synchronization by using received signal strength, a signal-to-noise ratio, or the like of received navigation satellite signals, when the number of invisible satellite signals received as multipath signals without direct waves is larger than the number of visible satellite signals that can be received as direct waves, contribution of invisible satellite signals may be relatively increased, and as a result, deterioration of accuracy may not be avoided.

(2-2) Method Using Weighting Based on Angle of Elevation

In a method of performing weighting on satellites with a large angle of elevation that are likely to be received as visible satellites, the number of satellites with a large angle of elevation may be reduced depending on positions of satellites over time, contribution of invisible satellite signals may be relatively increased, and as a result, deterioration of accuracy may not be avoided.

(3) Method of Attenuating Navigation Satellite Signals Inappropriate for Use in Navigation Satellite Antenna (3-1) Method Using Polarized Wave Isolation This is a method of attenuating signal strength of navigation satellite signals reflected an odd number of times in the navigation satellite antenna having isolation characteristics depending on circularly polarized waves with the use of inversion of a gyration direction of circularly polarized waves of reflected signals. In this method, although received strength of multipath signals can be attenuated to some degree, signals with strength of reception sensitivity of the navigation satellite signal reception apparatus or higher are received. Thus, the influence of multipath signals may not be eliminated. In addition, regarding signals reflected twice, a gyration direction is further inverted to return to the original direction, and thus attenuation cannot be achieved. For this reason, signals inappropriate for the use of positioning and time synchronization may not be sufficiently eliminated.

(3-2) Method Using Directivity Antenna

This is a method of attenuating reflected waves from the ground or a low angle of elevation with directivity of a vertically upward direction of the navigation satellite antenna. In this method, similarly to the above, although received signal strength of reflected waves can be attenuated to some degree, signals inappropriate for the use may not be sufficiently eliminated.

(4) Method of Performing Satellite Selection Using Statistic Processing

In a form of using so-called multi-GNSS in which a plurality of navigation satellite systems are used in combination, a larger number of visible satellites can be secured, and thus the form is effective in terms of enhancement of accuracy. However, in a method of performing satellite selection through statistic processing, there is a problem that a processing load of signals is exponentially increased along with an increase in the number of received navigation satellite signals. For this reason, in some cases, arithmetic for satellite selection may not be performed due to a limitation on resources for signal processing of the navigation satellite signal reception apparatus, or satellite selection may not be timely performed because of a long calculation time being required.

As described above, in the conventional techniques (1) to (4), selection of navigation satellite signals appropriate for the use in implementation of high-accuracy time synchronization or positioning and navigation satellite signals inappropriate for the use in implementation of high-accuracy time synchronization or positioning therefor may not be correctly performed.

The present disclosure is made in view of the problems described above, and has an object to provide a navigation satellite system reception apparatus that can effectively eliminate multipath signals without direct waves of invisible satellites in a reception environment in which the open space is significantly limited, such as in a case in which a navigation satellite antenna is installed on a wall surface or at a room window, and that can implement high-accuracy time synchronization or positioning.

Means for Solving the Problem

To achieve the above object, the disclosure of the present application is a navigation satellite system reception apparatus for performing at least one of positioning processing or time synchronization processing with a navigation satellite based on a navigation satellite signal received from a plurality of navigation satellites, the navigation satellite system reception apparatus including an orbit information acquisition unit configured to acquire orbit information of a navigation satellite of the plurality of navigation satellites, a position information acquisition unit configured to acquire position information of an installation position of the navigation satellite system reception apparatus, an azimuth information acquisition unit configured to acquire azimuth information of an azimuth perpendicular to a wall surface of an obstruction present adjacent to the navigation satellite system reception apparatus, a mask region calculating unit configured to calculate a mask region for selecting a navigation satellite of the plurality of navigation satellites to be a target of processing in the positioning processing or the time synchronization processing, based on the azimuth information, and a navigation satellite signal processing unit configured to calculate an azimuth and an angle of elevation of each of the plurality of navigation satellites with reference to the navigation satellite system reception apparatus based on the orbit information and the position information, select a navigation satellite of the plurality of navigation satellites to be a target of processing based on the azimuth and the angle of elevation that are respectively calculated and the mask region, and perform at least one of the positioning processing or the time synchronization processing based on a navigation satellite signal received from the navigation satellite that is selected.

Effects of the Invention

According to the present disclosure, an azimuth of an open space in a reception environment in which an open space in a specific azimuth is significantly limited such as in a case where a navigation satellite antenna is installed on a wall surface or at a room window can be detected, and invisible satellite signals of the invisible satellite located in an azimuth other than the azimuth of the open space can be effectively eliminated. As a result, visible satellite signals of the visible satellite located in an open space can be effectively selected. Thus, in comparison with the conventional technique, selection of navigation satellite signals appropriate for the use of time synchronization and positioning and navigation satellite signals inappropriate for the use of time synchronization and positioning therefor can be more accurately performed. Consequently, an effect of implementing high-accuracy time synchronization and positioning can be expected even in an environment in which open space is limited, invisible satellite signals are received as multipath signals without direct waves, and a reception state of navigation satellite signals is not satisfactory.

When the present disclosure is used for measurement of time synchronization accuracy of a time synchronization system, a time accuracy measurement device or a calibration location using an atomic oscillator is not required, measurement of time accuracy can be implemented with satisfactory accuracy by using navigation satellite signals that are received with a navigation satellite antenna provisionally installed at a window frame or the like at a measurement location.

DESCRIPTION OF EMBODIMENTS

Figure 1:
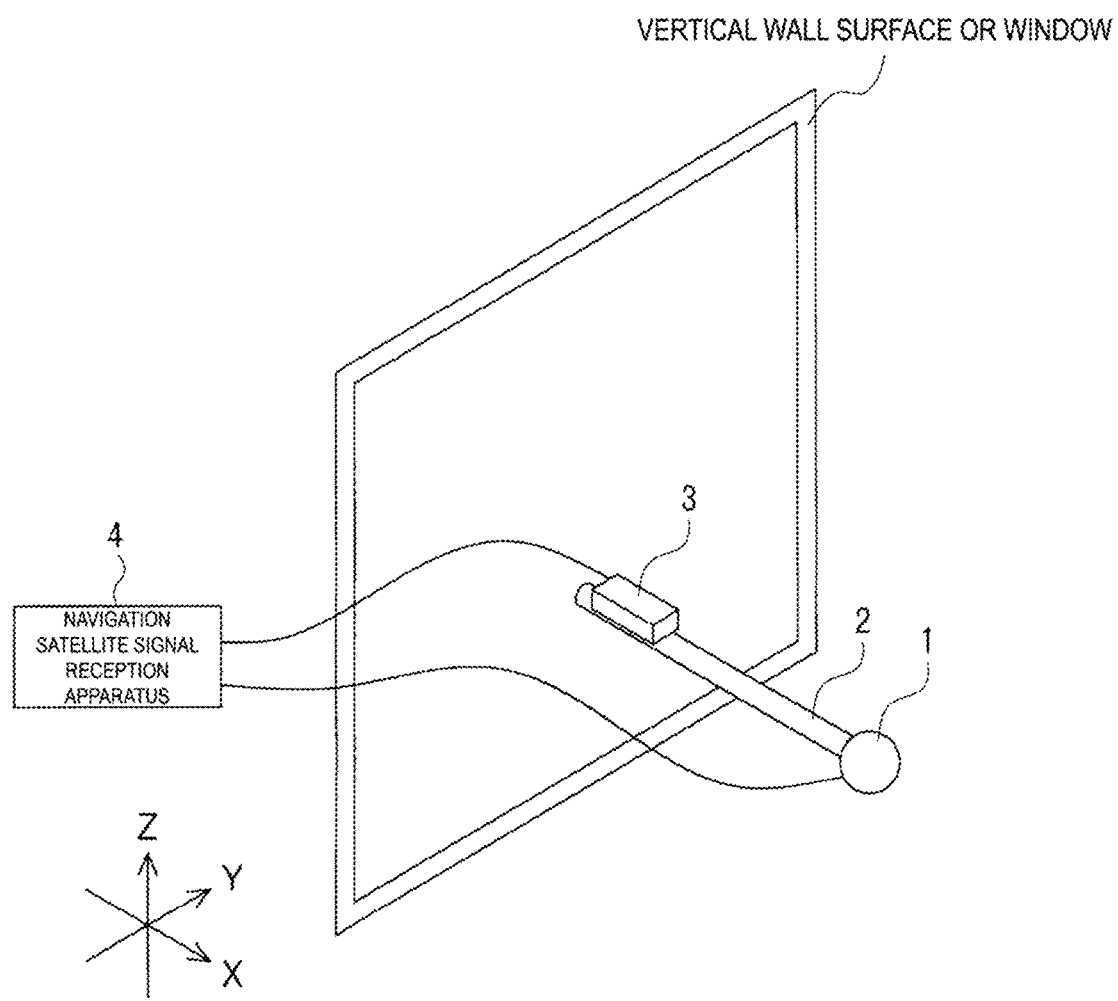
FIG. 1 is a configuration diagram of an overall system including a navigation satellite signal reception apparatus.

An overall configuration of a system including a navigation satellite signal reception apparatus according to one embodiment of the present disclosure is illustrated in FIG. 1. The present system includes a navigation satellite antenna 1, a support base 2, an azimuth meter 3, and a navigation satellite signal reception apparatus 4.

The navigation satellite antenna 1 is an antenna for receiving navigation satellite signals. The support base 2 is a function unit for fixing the navigation satellite antenna 1 and the azimuth meter 3 to a wall surface, a window frame, or the like. The azimuth meter 3 is a function unit for measuring an azimuth at which the support base 2 is installed. The navigation satellite signal reception apparatus 4 is a function unit that sets an azimuth mask to be described below, performs positioning by using filtered navigation satellite signals, and performs time synchronization, based on information of the azimuth measured in the azimuth meter 3. The configuration and the operation of each of the function units will be described below in detail.

The navigation satellite antenna 1 is connected to the navigation satellite signal reception apparatus 4 with a coaxial cable or the like, and transmits received navigation satellite signals to the navigation satellite signal reception apparatus 4. The navigation satellite antenna 1 may be an active antenna with an embedded amplifier for navigation satellite signals, or may be a passive antenna without such an embedded amplifier. The navigation satellite antenna 1 may have directivity in the vertically upward direction with an embedded ground plane or the like, and may have isolation characteristics of received navigation satellite signals in a gyration direction.

The support base 2 is fixed in a direction perpendicular to a wall surface or a window, and fixes relative positions of the navigation satellite antenna 1, the azimuth meter 3, and the wall surface being an obstruction. Although the distance between the navigation satellite antenna 1 and the wall surface or the window may be any distance, a longer distance provides a wider region including the periphery of the zenith of an open space in which navigation satellite signals can be received in the line of sight state by the navigation satellite antenna 1, and enables reception of a larger number of navigation satellite signals as visible satellite signals.

The azimuth meter 3 measures an installation azimuth of the support base 2. The azimuth meter 3 and the navigation satellite signal reception apparatus 4 are connected together with a wired or wireless transmission medium, and information of the measured azimuth is transmitted to the navigation satellite signal reception apparatus 4. Examples of the wired medium include a LAN cable and a serial transmission cable. Examples of the wireless medium include Wi-Fi (trade name) (IEEE802.11), Bluetooth (trade name), specified low power radio, and infrared light. The azimuth meter 3 performs measurement of the azimuth by using a magnetic sensor, a gyrocompass, or the like. In addition, a method of measuring the azimuth by measuring a relative reception position based on navigation satellite signals received from two navigation satellite antennas mounted on the support base may be used. A terminal such as a smartphone may be used as an azimuth meter.

Figure 2:
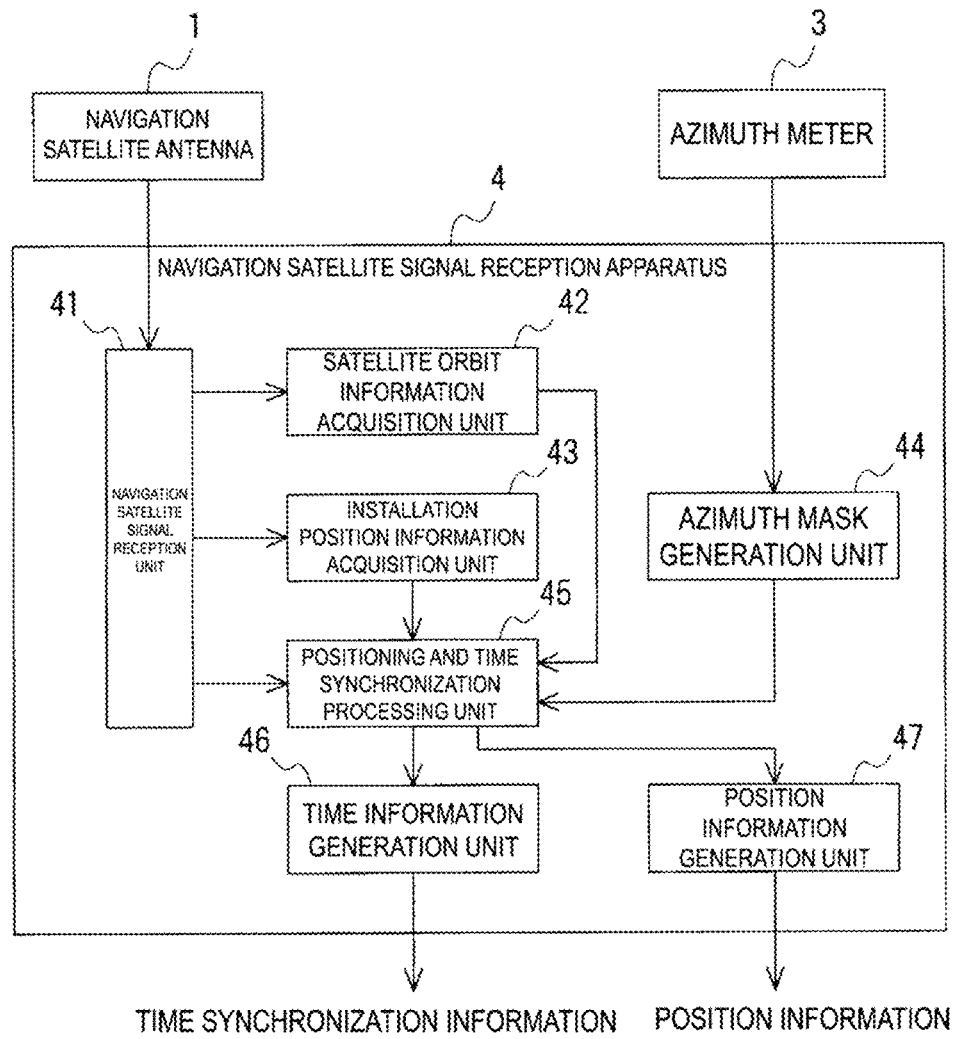
FIG. 2 is a functional block diagram of a navigation satellite signal reception apparatus.

The navigation satellite signal reception apparatus 4 performs positioning and time synchronization by using navigation satellite signals received by the navigation satellite antenna 1. In this case, filtering of navigation satellite signals is performed based on the installation azimuth of the support base 2 measured in the azimuth meter 3. The function and the operation of the navigation satellite signal reception apparatus 4 will be described with reference to FIGS. 2 and 3. FIG. 2 is a functional block diagram of the navigation satellite signal reception apparatus, and FIG. 3 is a flowchart for describing the operation of the navigation satellite signal reception apparatus.

As illustrated in FIG. 2, the navigation satellite signal reception apparatus 4 includes a navigation satellite signal reception unit 41 that receives navigation satellite signals transmitted from the navigation satellite antenna 1, a satellite orbit information acquisition unit 42, an installation position information acquisition unit 43, an azimuth mask generation unit 44, a positioning and time synchronization processing unit 45, a time information generation unit 46, and a position information generation unit 47. The navigation satellite signal reception apparatus 4 may be implemented in any form. The navigation satellite signal reception apparatus 4 may be implemented by installing a program in a computer including one or more processors, or may be implemented as a dedicated hardware apparatus.

Figure 3:
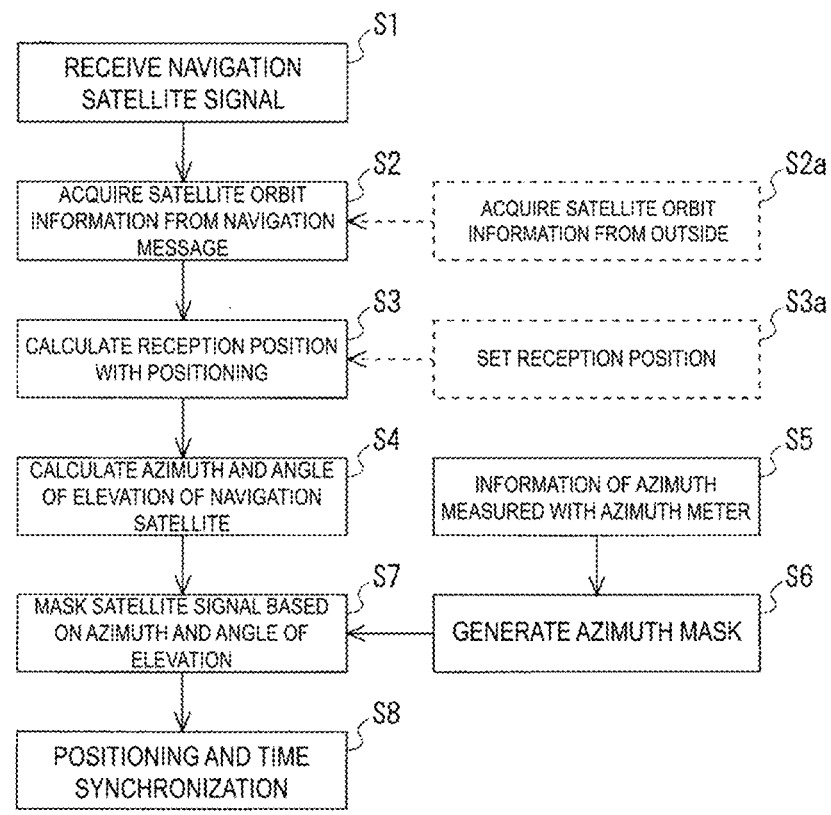
FIG. 3 is a flowchart for describing an operation of a navigation satellite signal reception apparatus.

The satellite orbit information acquisition unit 42 acquires satellite orbit information through the navigation satellite signals received by the navigation satellite antenna 1 (see Step S2 of FIG. 3). When GPS satellites are used, data of the satellite orbit information includes two types, called the Almanac and the Ephemeris, which can be acquired from navigation messages included in the navigation satellite signals. In addition to the method of acquiring from navigation messages, examples of methods of acquiring the satellite orbit information include a method of acquiring satellite orbit information by using a Secure User Plane Location (SUPL) server via a mobile network by means of Assisted GNSS and a method of acquiring orbit information available on the Internet (see Step S2a of FIG. 3). One example of a website that shows orbit information of navigation satellites is given below:
URL: http://sys.qzss.go.jp/dod/archives/pnt.html The installation position information acquisition unit 43 calculates, based on received navigation satellite signals from four or more satellites, a reception position that is specifically an installation position of the navigation satellite signal reception apparatus 4, and more specifically an installation position of the navigation satellite antenna 1 (see Step S3 of FIG. 3). For the acquisition of the reception position, values of three-dimensional coordinates may be set (see Step S3a of FIG. 3). As the values of three-dimensional coordinates, data of latitude, longitude, altitude, is used, for example.

The azimuth mask generation unit 44 generates and sets a mask (hereinafter referred to as an azimuth mask) for navigation satellite signals using a combination of thresholds of the azimuth and the angle of elevation for filtering navigation satellite signals of a specific azimuth, based on the installation azimuth of the support base 2 measured in the azimuth meter 3 (see Steps S5 and S6 of FIG. 3). The azimuth mask is set in the following manner: the mask is set on a side opposite to the direction in which the navigation satellite antenna 1 is installed, i.e., the azimuth in which the open space is limited with the wall surface, with an azimuth perpendicular to the azimuth of the azimuth meter 3 being a threshold (boundary), in polar coordinates with the center being the installation position of the navigation satellite signal reception apparatus 4. In this case, an offset value of the azimuth determined by relative positions between the azimuth meter 3 and the support base 2 is corrected as appropriate in setting of the mask. In the example of FIG. 1, the azimuth meter 3 is installed in an azimuth perpendicular to the wall surface being an obstruction. However, the azimuth meter 3 may be installed in another predetermined azimuth. In this case, predetermined correction processing is performed on an azimuth detected in the azimuth meter 3 in setting of the mask.

Figure 4:
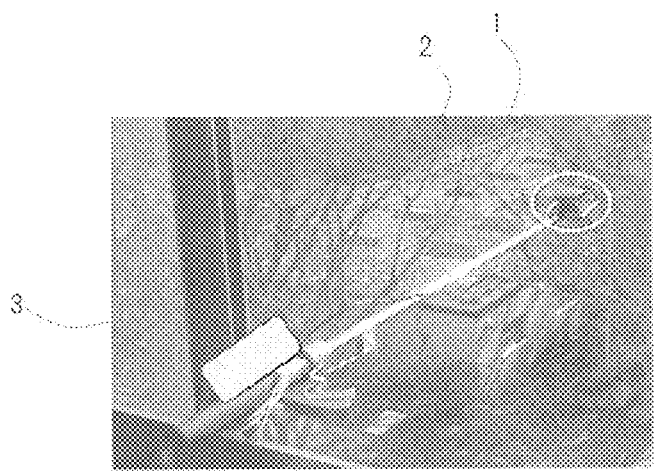
FIG. 4 is an example of a reception environment in which a navigation satellite antenna is installed toward outside of a room from a window.
Figure 5:
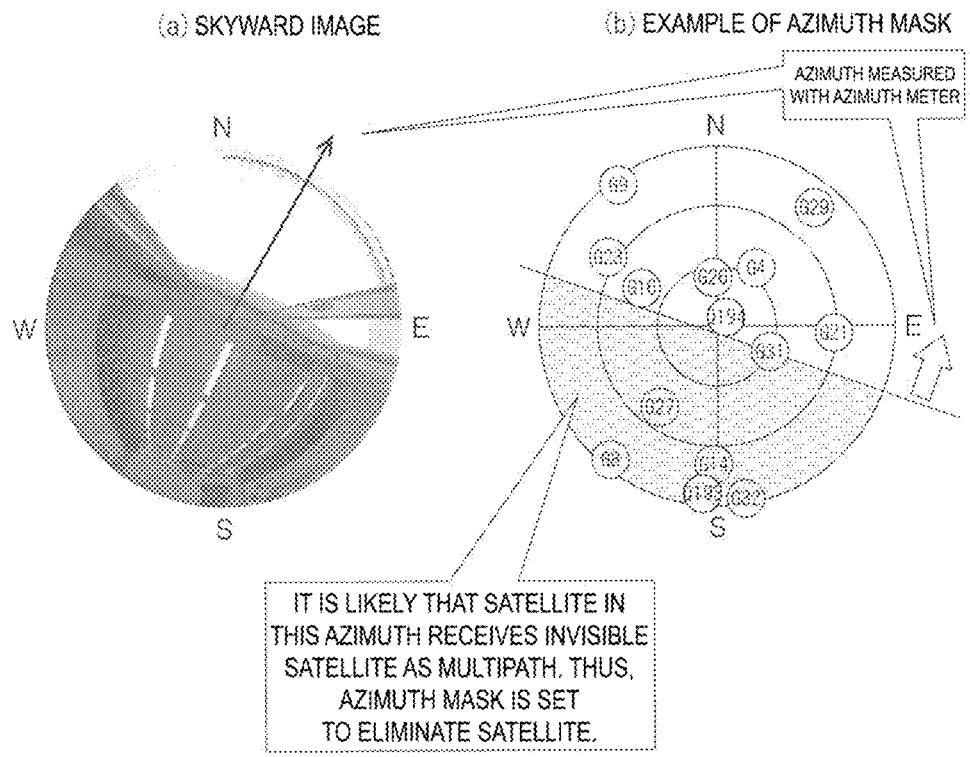
FIG. 5 is a schematic diagram for describing setting of an azimuth mask.

An example of setting the azimuth mask is illustrated in FIGS. 4 and 5. FIG. 4 is an example of a reception environment in which the navigation satellite signal reception apparatus 4 is located inside a room and the support base 2 is fixed to a window frame toward the outside of the room. FIG. 5(a) illustrates an example of a skyward image in the reception environment of FIG. 4. FIG. 5(b) illustrates an example of an azimuth mask in the reception environment. The azimuth mask has a semicircular shape as illustrated in FIG. 5(b).

The positioning and time synchronization processing unit 45 performs positioning processing and time synchronization processing with navigation satellites, based on a plurality of navigation satellite signals received in the navigation satellite antenna 1. Here, the positioning and time synchronization processing unit 45 selects navigation satellite signals to be a target of processing out of all of the received navigation satellite signals by using the azimuth mask. Specifically, the positioning and time synchronization processing unit 45 calculates an azimuth and an angle of elevation of each navigation satellite signal received by the navigation satellite antenna 1, based on the satellite orbit information acquired by the satellite orbit information acquisition unit 42 and the reception position acquired by the installation position information acquisition unit 43 (see Step S4 of FIG. 3). Then, based on the azimuth and the angle of elevation of each navigation satellite signal and the azimuth mask generated in Step S6, the positioning and time synchronization processing unit 45 selects navigation satellite signals to be a target of processing (see Step S7 of FIG. 3), and performs the positioning processing and the time synchronization processing based on the selected navigation satellite signals (see Step S8 of FIG. 3). In the example of FIG. 5, navigation satellite signals plotted at positions other than the azimuth mask (hatched part) are used as a target of processing.

The time information generation unit 46 outputs results of the time synchronization in a predetermined format. In one example, as the time information, timecode data in a format of National Marine Electronics Association (NMEA) 0183 or the like for reporting timing signals in a signal format of one Pulse Per Second (PPS) or the like in synchronization with navigation satellite signals and information (Time of the Day (ToD)) related to absolute time such as hour and second is used.

The position information generation unit 47 outputs results of the positioning in a predetermined format. The results of the positioning are output in a format such as NMEA 0183.

Note that, as attached information of the results of time synchronization and the results of positioning, the positioning and time synchronization processing unit 45 can output a navigation satellite system type, a satellite number, or the like in a format such as NMEA 0183 as information related to a navigation satellite.

As described above, by setting an azimuth mask in a reception environment in which an open space in which the navigation satellite antenna 1 is installed at a window frame or a wall surface is significantly limited according to the present disclosure, invisible satellite signals of the invisible satellite located at skyward positions blocked by a structure can be effectively eliminated, thus allowing for enhancement of accuracy in positioning and time synchronization. In the conventional method using an SNR mask, when interference waves are received, the SNR of received navigation satellite signals may be lowered as a whole, and accordingly, the number of satellites equal to or greater than a threshold of the SNR may be reduced, and positioning and time synchronization may be hindered. In the present disclosure; however, interference waves do not affect selection of navigation satellite signals.

Note that the reception position calculated in the process of Step S3 of FIG. 3 may include errors due to limitation on the open space and reception of multipath signals. However, considering a relative positional relationship with satellites located on an orbit at a high altitude (when using GPS satellites, approximately 20000 km above the ground), there is only a slight influence on errors at the time of calculating an azimuth and an angle of elevation of each navigation satellite signal.

Figure 6:
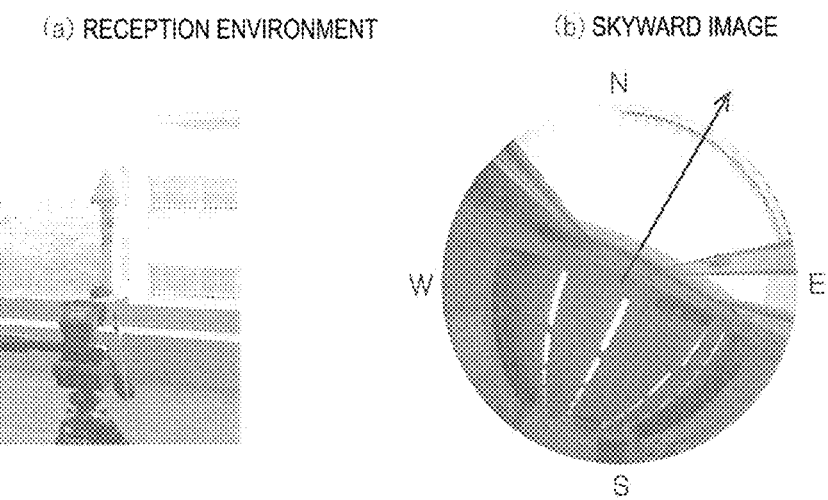
FIG. 6 is a diagram illustrating a reception environment in which a navigation satellite antenna is installed at a room window and a skyward image.
Figure 7:
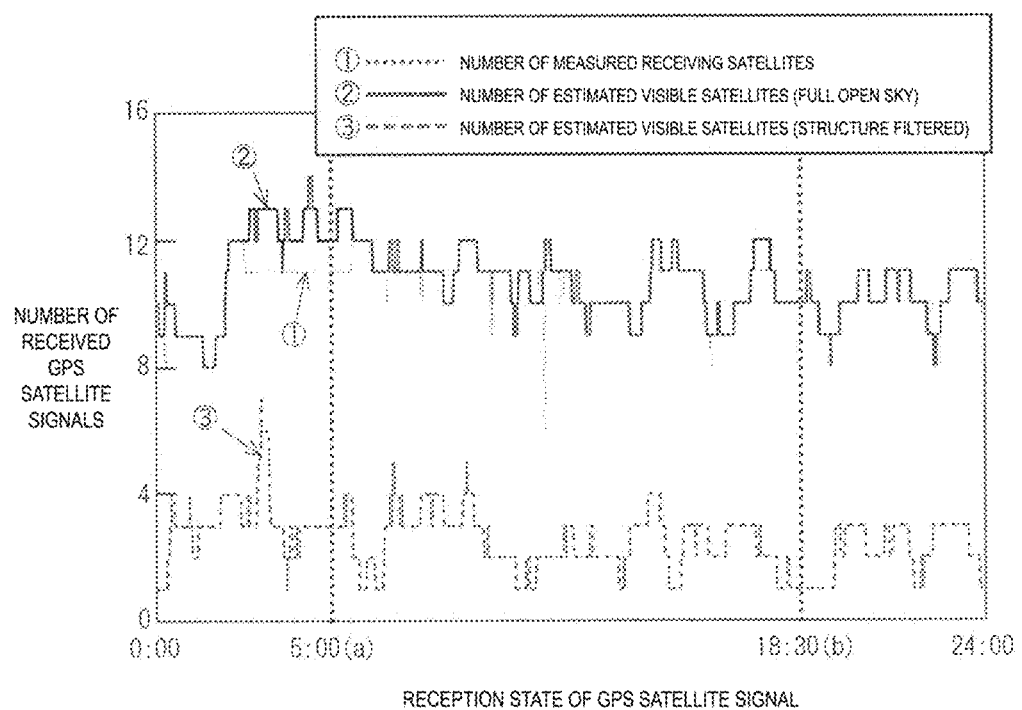
FIG. 7 is a diagram illustrating a reception state of a GPS satellite signal in a reception environment of FIG. 6.
Figure 8:
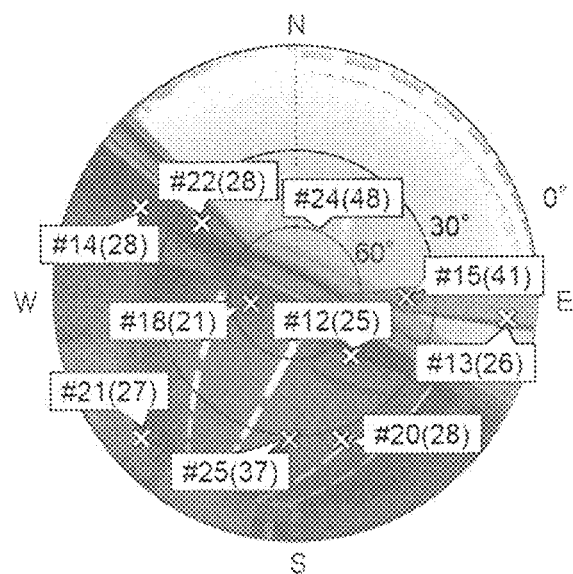
FIG. 8 is a diagram illustrating positions of GPS satellites at time (a) of FIG. 7.
Figure 9:
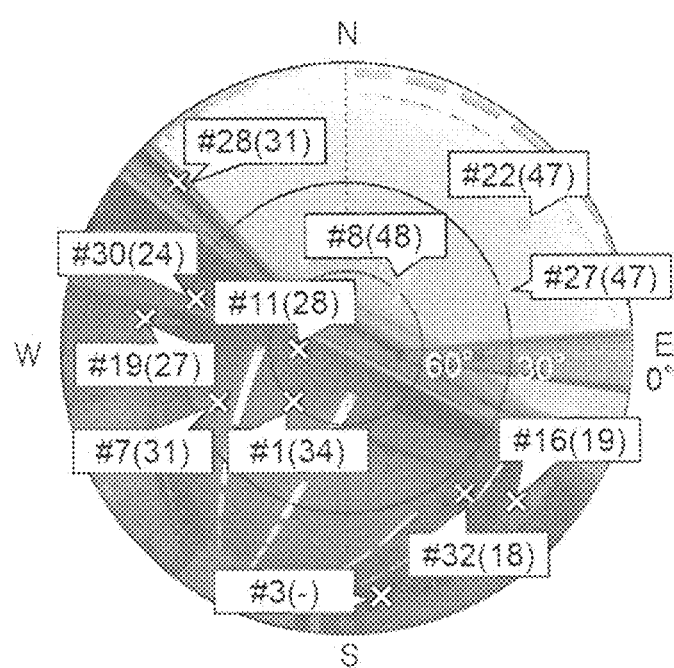
FIG. 9 is a diagram illustrating positions of GPS satellites at time (b) of FIG. 7.

An example of improvement of time synchronization accuracy using an azimuth mask of the navigation satellite signal reception apparatus will be described. In the present example, an example of improvement of time synchronization accuracy in a multipath reception environment in which the navigation satellite antenna is installed at a room window will be described. FIG. 6 is a diagram illustrating a reception environment in which the navigation satellite antenna is installed at a room window and a skyward image, FIG. 7 is a diagram illustrating a reception state of GPS satellite signals in the reception environment of FIG. 6, FIG. 8 is a diagram illustrating positions of GPS satellites at time (a) of FIG. 7, and FIG. 9 is a diagram illustrating positions of GPS satellite at time (b) of FIG. 7. Note that, in the present example, signals of GPS satellites and quasi-zenith satellites (Quasi-Zenith Satellite System (QZSS)) are received. In the present reception environment, a window faces an azimuth of approximately 30 degrees. Specifically, a value indicated by the azimuth meter 3 is approximately 30 degrees.

Figure 10:
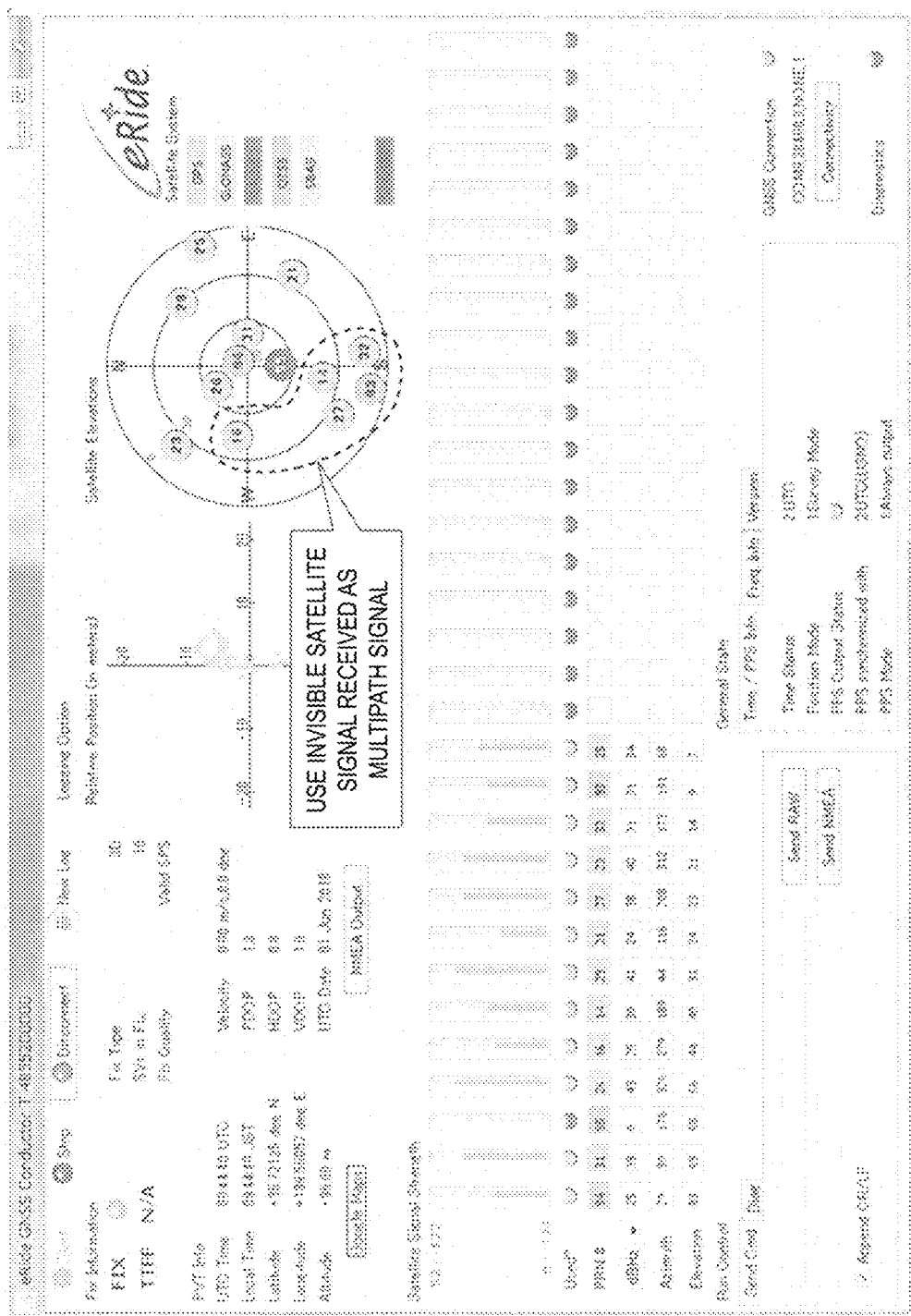
FIG. 10 is a screenshot of software that observes a reception state of navigation satellite signals (without an azimuth mask).
Figure 11:
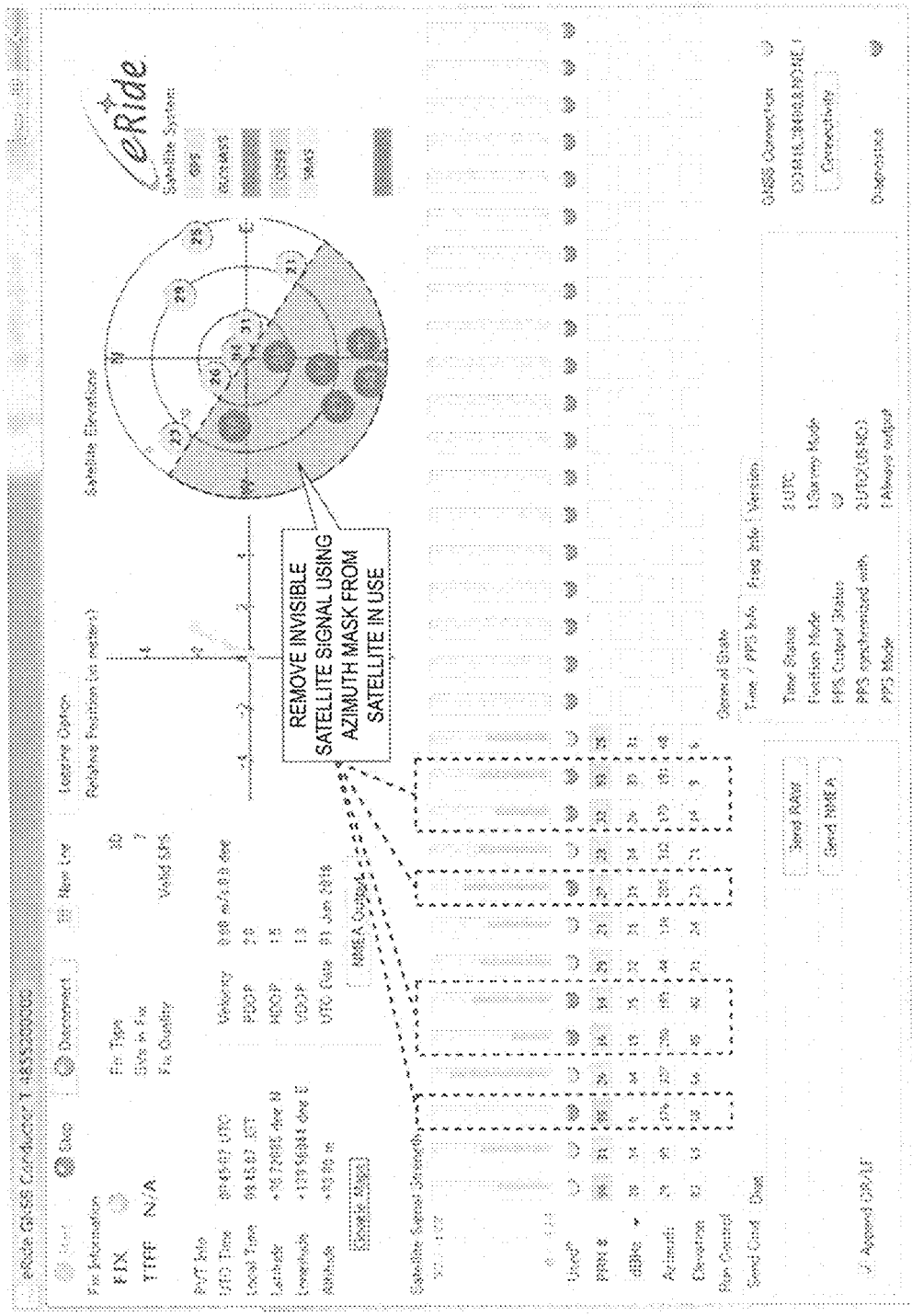
FIG. 11 is a screenshot of software that observes a reception state of navigation satellite signals (with an azimuth mask).

FIGS. 10 and 11 are screenshots of software that observes a reception state of navigation satellite signals in the present reception environment described above. FIG. 10 illustrates an example of a reception state of GPS signals and QZSS signals in a case of observation using the navigation satellite signal reception apparatus in which an azimuth mask is not set and FIG. 11 illustrates an example of a reception state of GPS signals and QZSS signals in a case of observation using the navigation satellite signal reception apparatus in which an azimuth mask is set for the sake of comparison of both the cases. Note that, in FIGS. 10 and 11, satellites with a satellite number of less than 40 represent GPS satellites, and satellites with a satellite number of 90 or greater represent GZSS satellites.

In the navigation satellite signal reception apparatus (FIG. 10) in which an azimuth mask is not set, regarding the 14th, 16th, 27th, 32nd GPS satellite signals and the 93rd QZSS signal, invisible satellite signals of the invisible satellite located at positions blocked by a structure are received as multipath signals, and are used for positioning and time synchronization. Although the 95th satellite located at a position close to the zenith and having a large angle of elevation is not used for positioning and time synchronization, it is thought that other invisible satellite signals are reflected and diffracted by a nearby structure and reach the navigation satellite antenna. In contrast, it can be understood that, in the navigation satellite signal reception apparatus (FIG. 11) in which the navigation satellite signals of the navigation satellite located at positions in an azimuth of from 120 degrees to 300 degrees corresponding to an azimuth of 30 degrees of the window are masked, these invisible satellite signals are not used for positioning and time synchronization.

Figure 12:
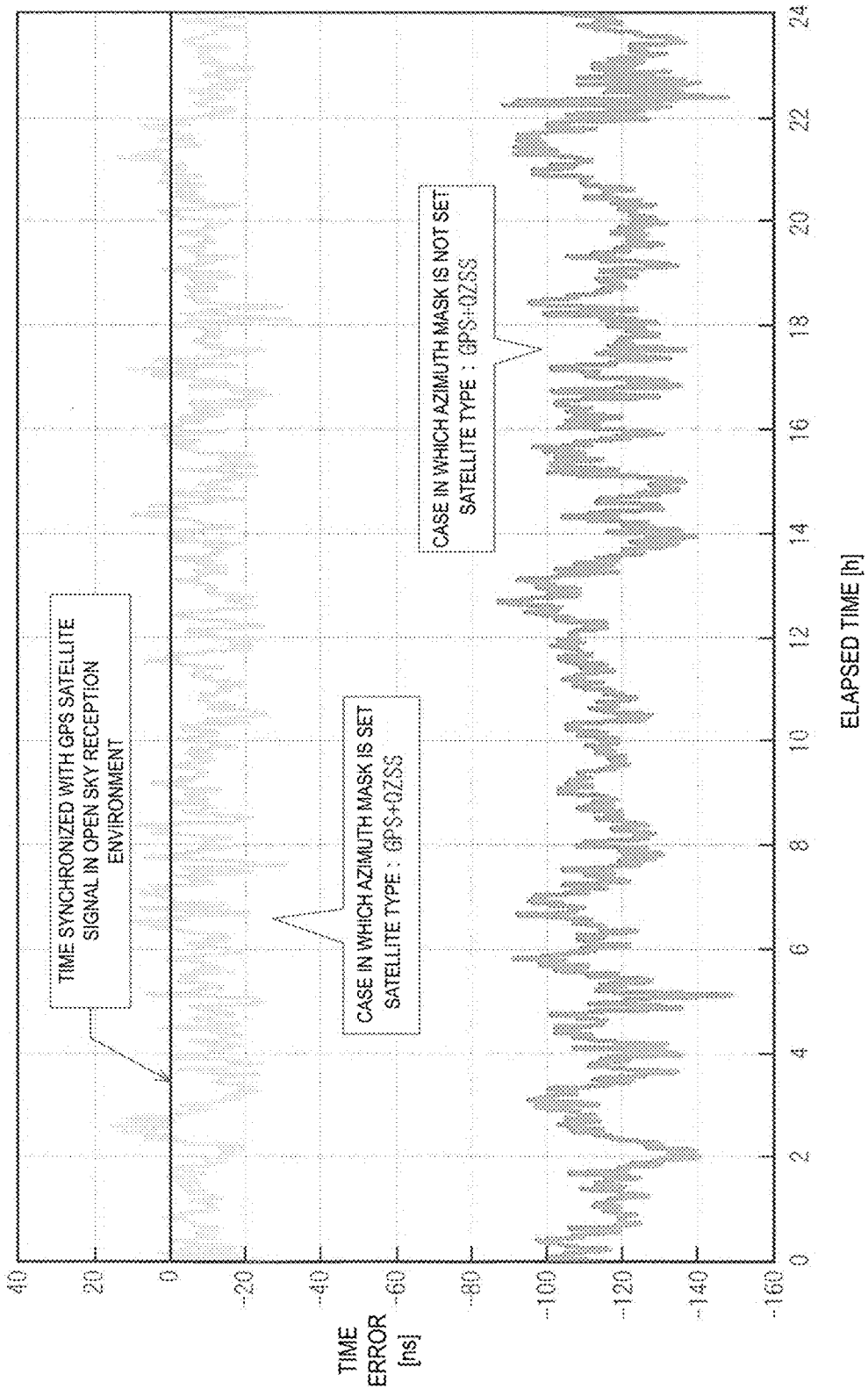
FIG. 12 shows measurement results of improvement of time synchronization accuracy in a multipath reception environment.
Figure 19:
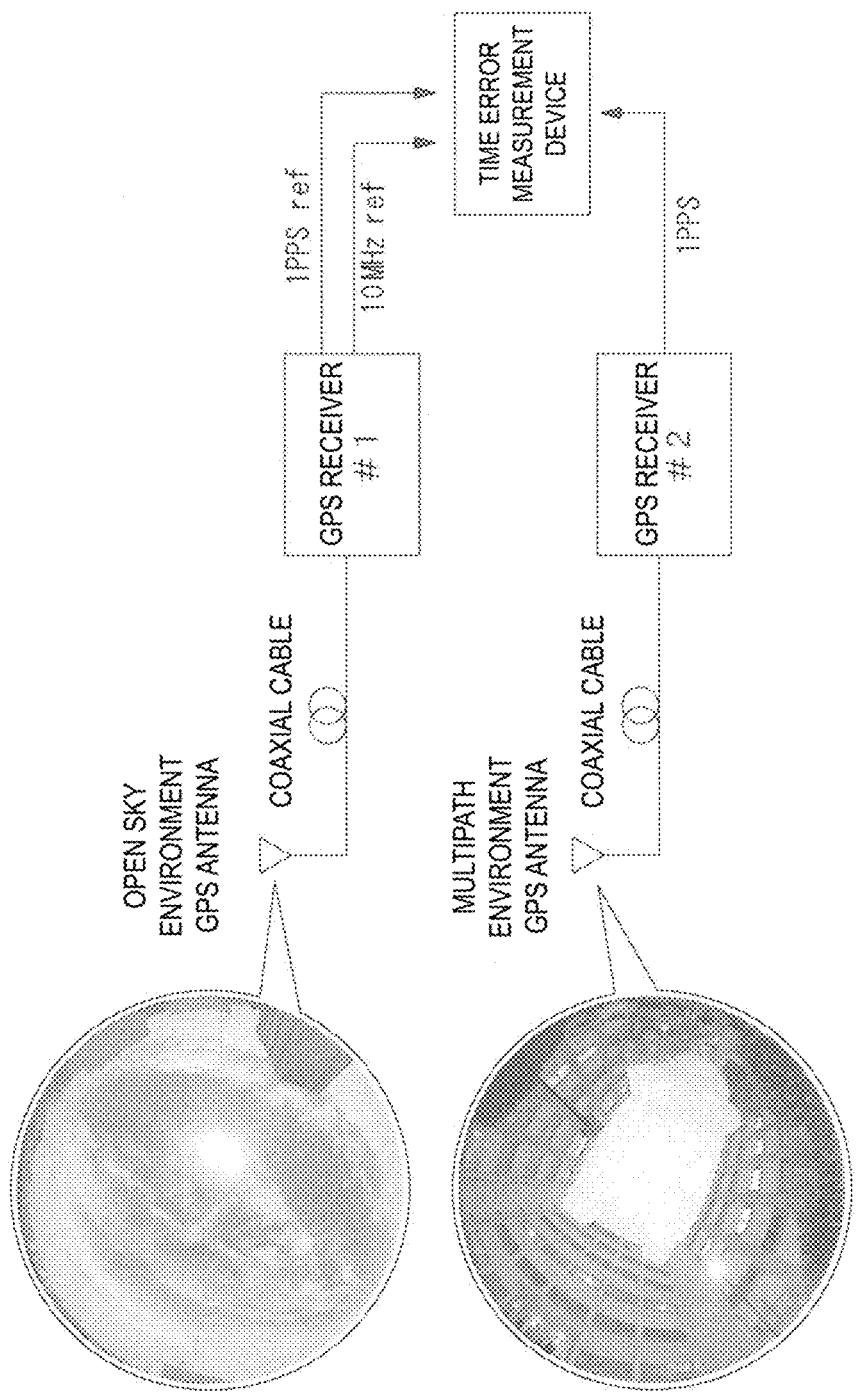
FIG. 19 is a configuration diagram illustrating a measurement system of time accuracy in a multipath reception environment.
Figure 20:
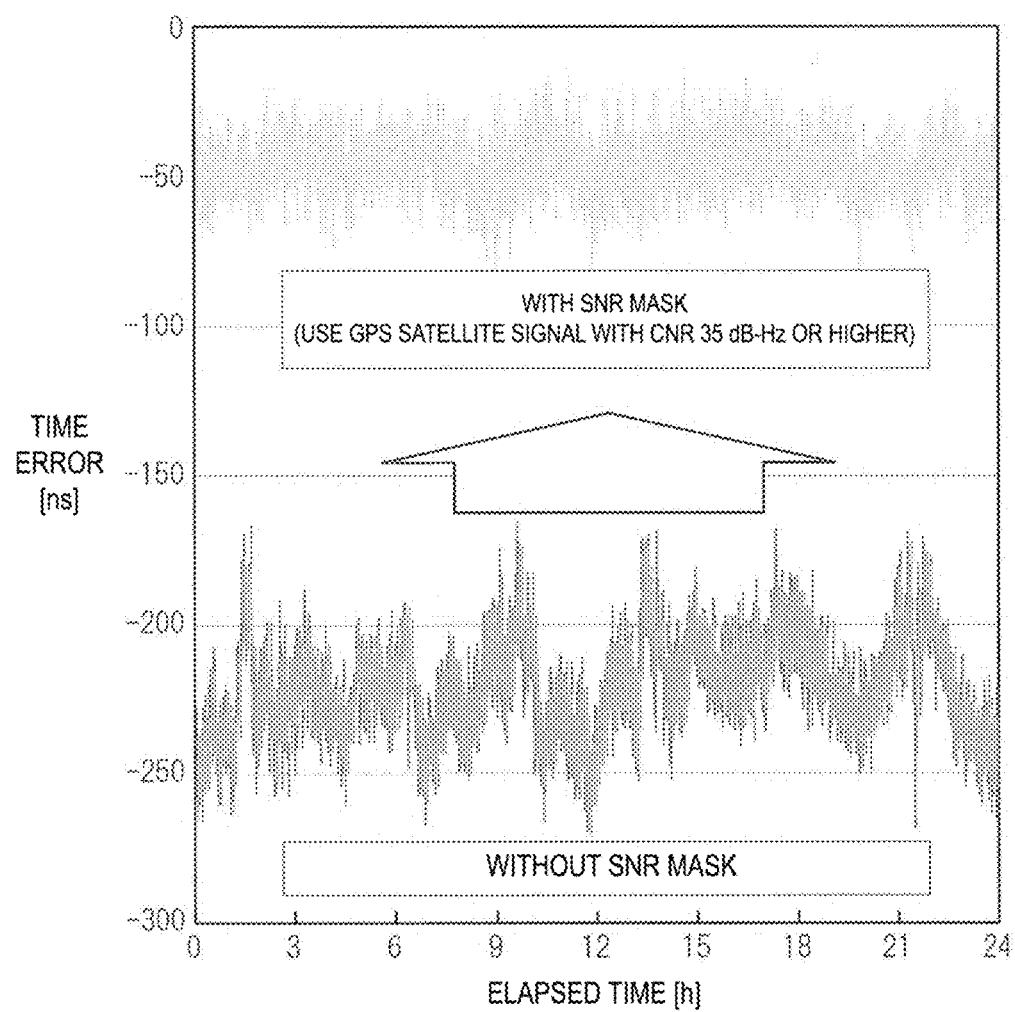
FIG. 20 shows deterioration of time accuracy in a multipath reception environment and measurement results of an improvement effect with an SNR mask.
Figure 21:
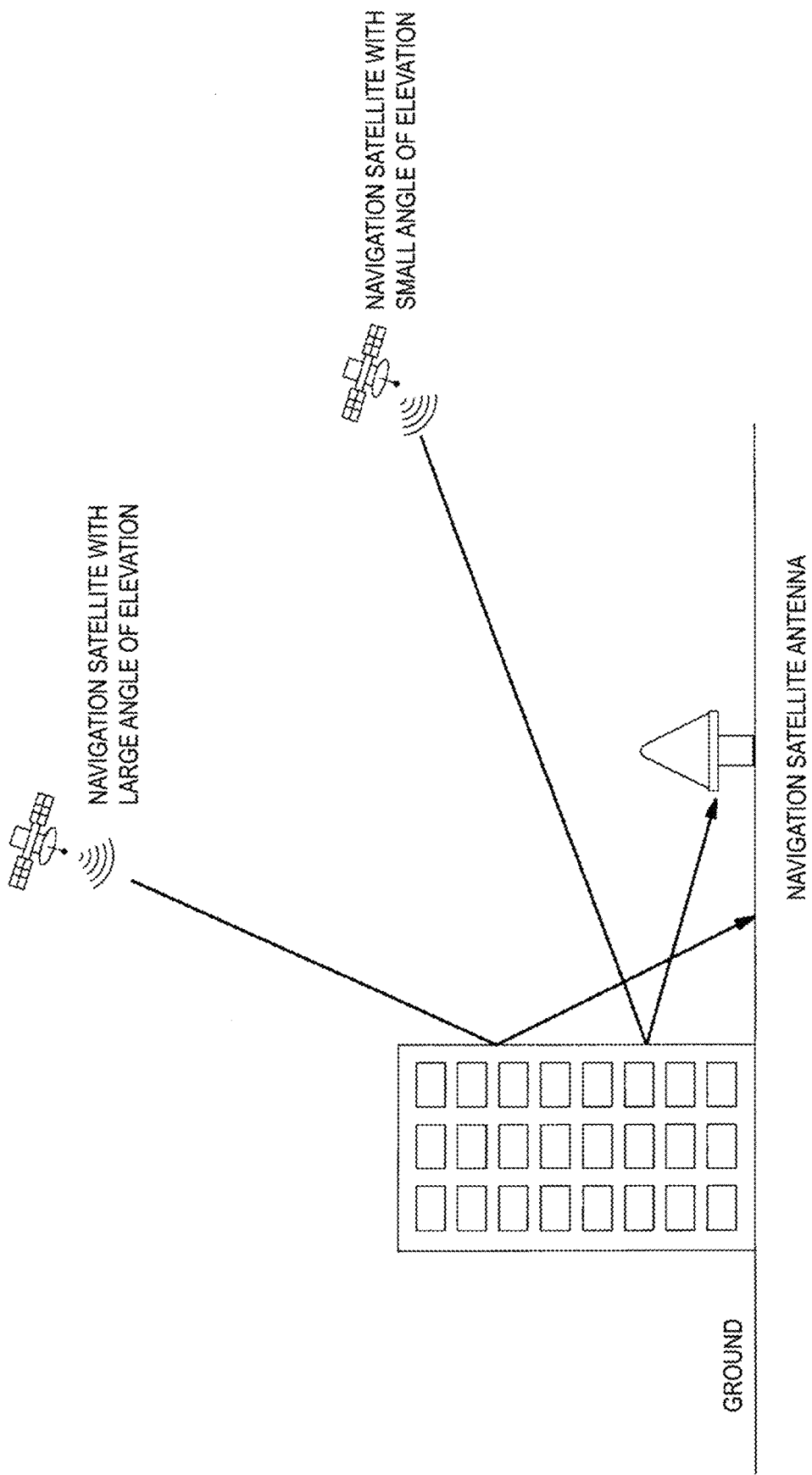
FIG. 21 is a schematic diagram illustrating a relationship between an angle of elevation of a navigation satellite and a reflected wave.
Figure 22:
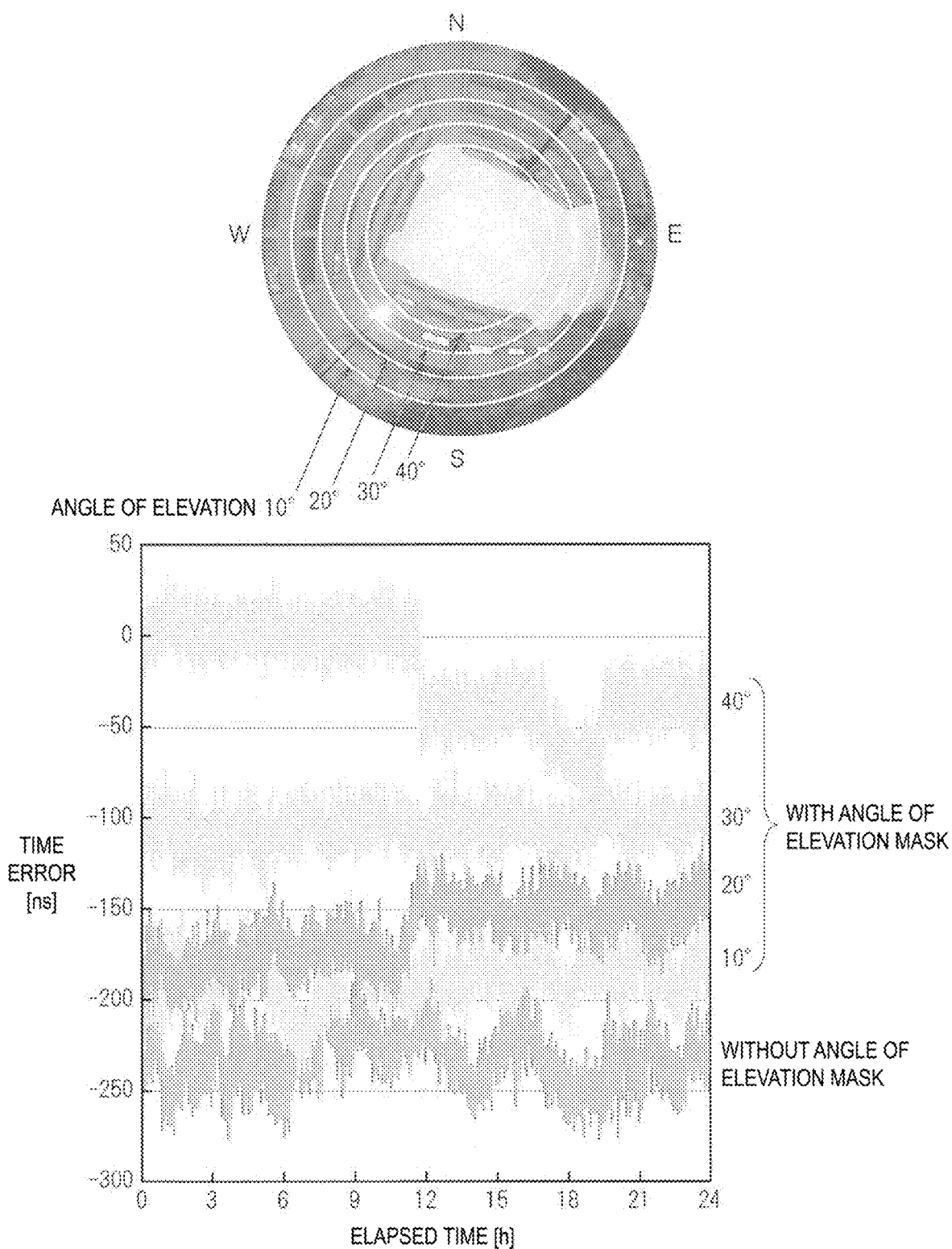
FIG. 22 shows deterioration of time accuracy in a multipath reception environment and measurement results of an improvement effect with an angle of elevation mask.

FIG. 12 illustrates measurement results of time errors measured by using a measurement system illustrated in FIG. 19 described above regarding the navigation satellite signal reception apparatus in which the azimuth mask is set and the navigation satellite signal reception apparatus in which the azimuth mask is not set. In the navigation satellite signal reception apparatus in which the azimuth mask is not set, a maximum value of an absolute value of time errors (max|TE|) within a 24-hour continuous measurement period is approximately 150 ns, whereas the navigation satellite signal reception apparatus in which the azimuth mask is set, by contrast, it is significantly reduced to as small as approximately 30 ns, and an effect of improvement of time synchronization accuracy by virtue of the setting of the azimuth mask is therefore confirmed.

One embodiment of the present disclosure has been described in detail above. The present disclosure; however, is not limited to this. For example, in the above embodiment, the navigation satellite antenna 1, the azimuth meter 3, the navigation satellite signal reception apparatus 4, and the support base 2 are separated from each other. However, a part or all of these components may be integrated together.

Setting of the azimuth mask may be adjusted in consideration of the length of the support base 2 and the height of the wall surface from the installation position of the support base 2 with respect to the wall surface.

Figure 13:
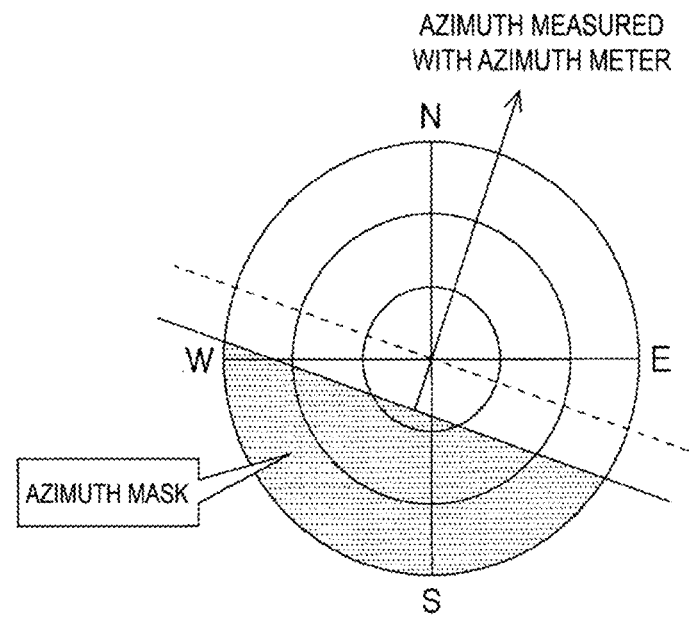
FIG. 13 illustrates a modification of an azimuth mask.

For example, in the above embodiment, as the azimuth mask, a semicircular region on a side opposite to a region in an azimuth toward an open space side with respect to a wall surface of an obstruction with a boundary being both azimuths perpendicular to the azimuth toward the open space side with respect to the wall surface of the obstruction in polar coordinates with the center being the installation position of the navigation satellite signal reception apparatus 4 is used. However, a region included in the semicircular region may be used. Specifically, as illustrated in FIG. 13, a region having an arc shape with its chord being in parallel with the semicircular region in a skyward image may be used.

Figure 14:
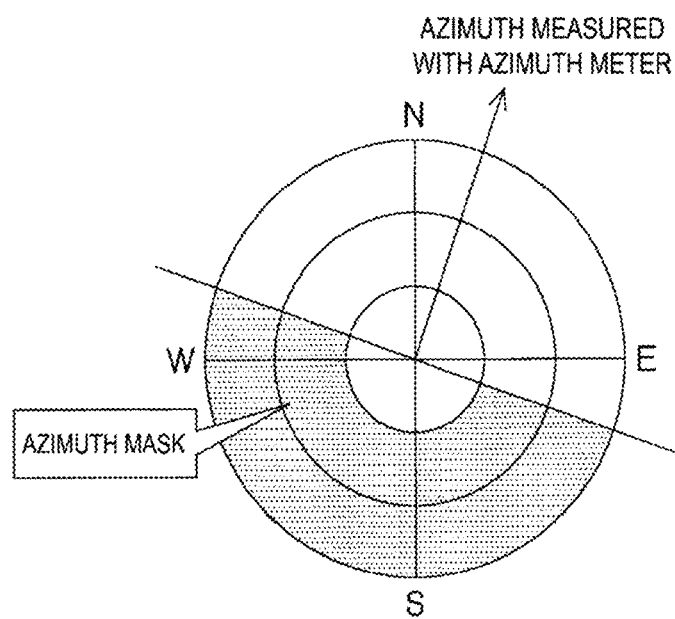
FIG. 14 illustrates a modification of an azimuth mask.

In the above embodiment, as the azimuth mask, a semicircular region defined by a threshold solely with respect to an azimuth in polar coordinates with the center being the installation position of the navigation satellite signal reception apparatus 4 is used. However, as illustrated in FIG. 14, a region including a boundary defined by a threshold with respect to an angle of elevation may be used. Note that the example of FIG. 14 is also an example of a region included in a semicircular region.

Figure 15:
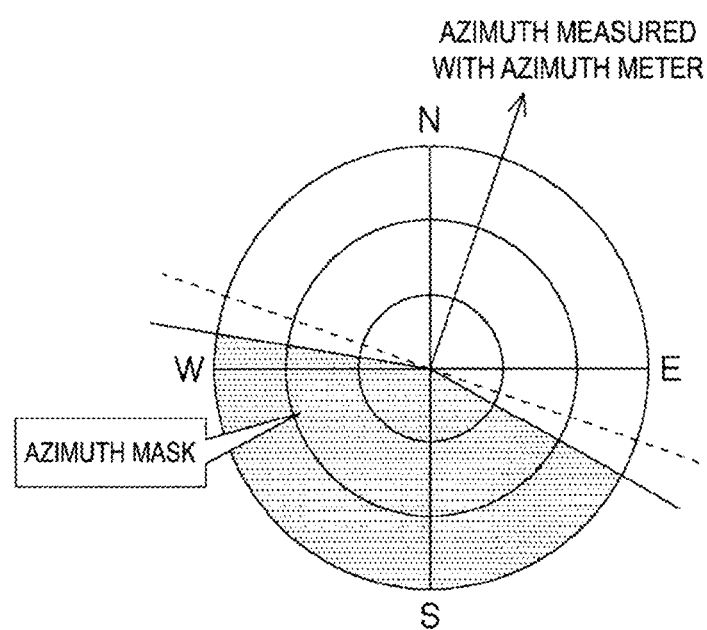
FIG. 15 illustrates a modification of an azimuth mask.
Figure 16:
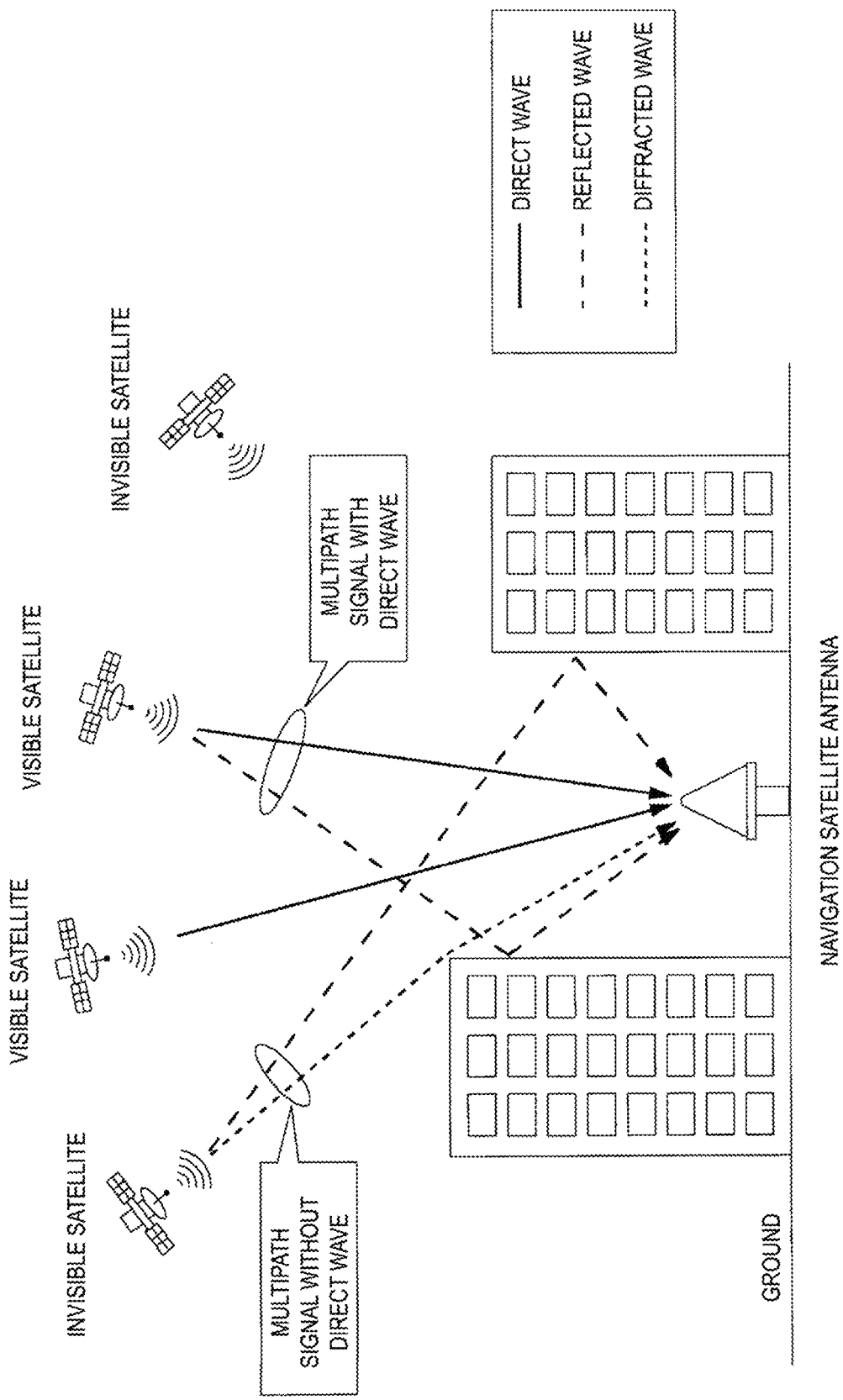
FIG. 16 is a schematic diagram for describing an occurrence state of multipath signals.
Figure 17:
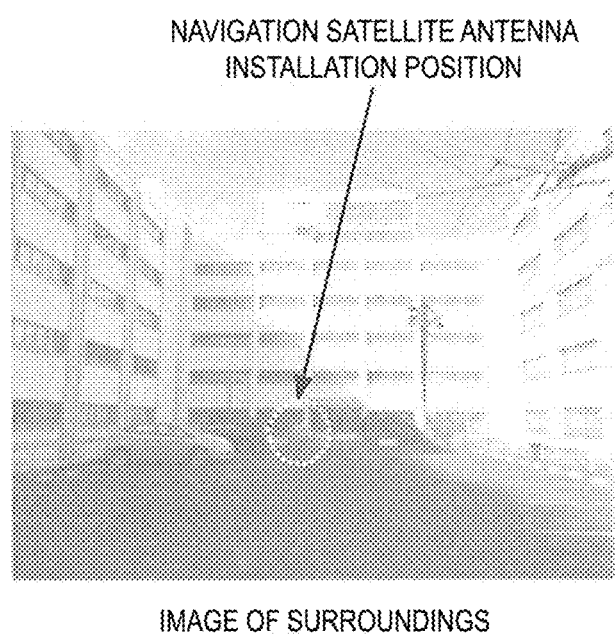
FIG. 17 is a diagram for describing an environment in which multipath signals are received.
Figure 18:
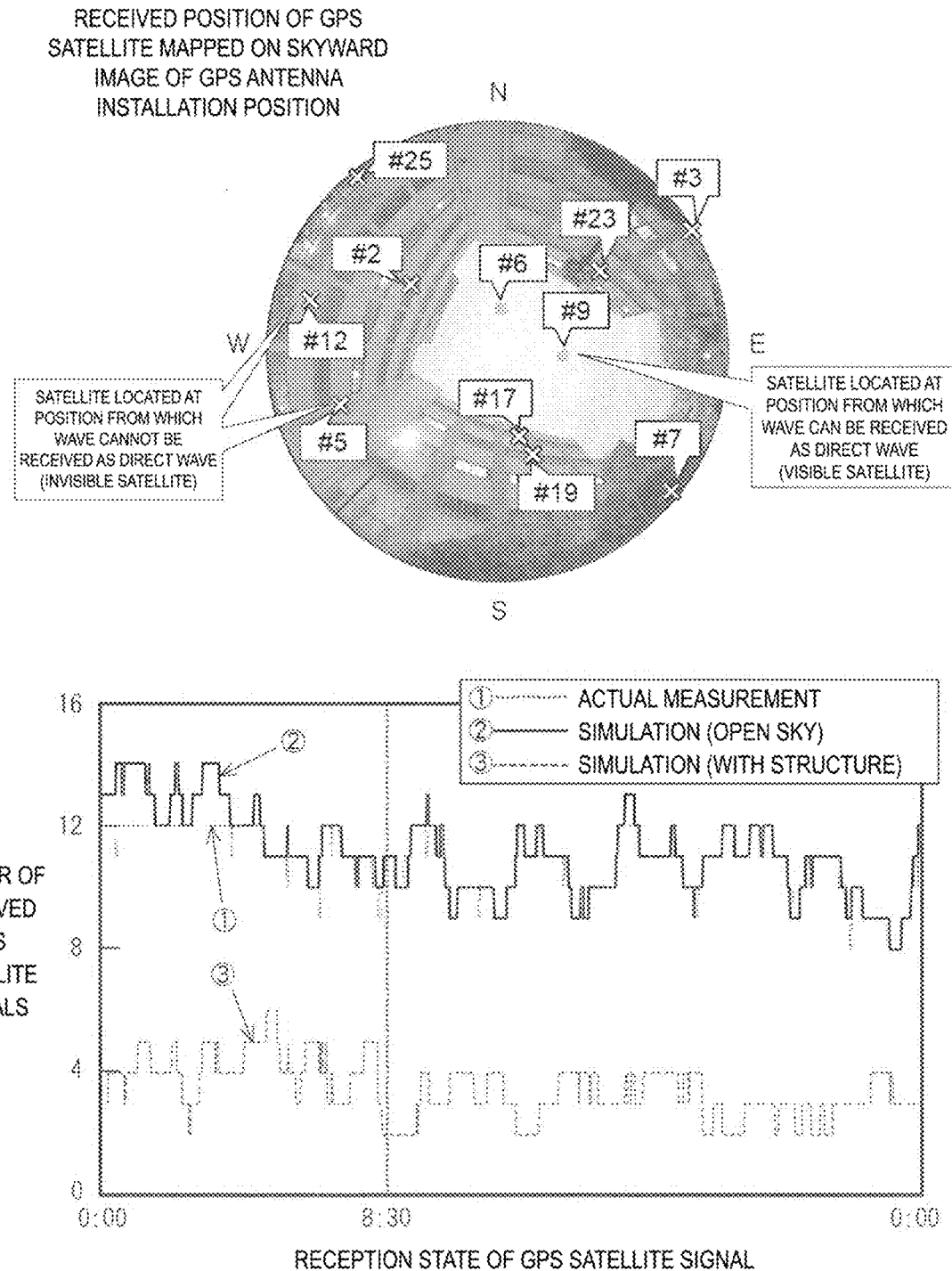
FIG. 18 is a diagram for describing a reception state of multipath signals.

A margin may be set to a threshold of an azimuth or an angle of elevation that may be used for defining a region of an azimuth mask. For example, as illustrated in FIG. 15, a margin with respect to an azimuth may be set for the azimuth mask of the semicircular region. Note that the example of FIG. 15 is also an example of a region included in a semicircular region. In a similar manner, the example of FIG. 15 is also an example of a region defined by a threshold solely with respect to an azimuth.

A mask having any shape can be set by setting a threshold of an angle of elevation for each azimuth, other than the above azimuth mask.

In the above embodiment, as a measure for acquiring azimuth information of an azimuth perpendicular to a wall surface of an obstruction present near the navigation satellite signal reception apparatus 4 from the installation position of the navigation satellite signal reception apparatus 4, the support base 2 and the azimuth meter 3 are used. However, the support base 2 can be omitted if the azimuth meter 3 can be installed toward a predetermined azimuth with respect to the wall surface of the obstruction.

The above embodiment illustrates as example in which both the positioning processing and the time synchronization processing are performed by the navigation satellite signal reception apparatus 4. However, the present disclosure can be applied also with a configuration in which either the positioning processing or the time synchronization processing is performed.

In above embodiment, the position of the navigation satellite antenna 1 is fixed. However, the present disclosure can be applied in a form of moving the navigation satellite antenna. In one example, time synchronization accuracy and positioning accuracy can be improved over time by applying the present disclosure to a side surface of a mobile object such as a monorail and adaptively setting an azimuth mask for the state of an open space that varies over time.

In the above embodiment, the present disclosure can be applied also in a form of using multi-GNSS. In this case, enhancement of accuracy is expected since the number of visible satellite signals is increased. As targets of combinations, not only a global navigation satellite system, but also a local navigation satellite system can be used. Examples of the global navigation satellite system include GPS, GLONASS, Galileo, and Beidou, and examples of the local navigation satellite system include QZSS.

REFERENCE SIGNS LIST

1 . . . Navigation satellite antenna
2 . . . Support base
3 . . . Azimuth meter
4 . . . Navigation satellite signal reception apparatus
41 . . . Navigation satellite signal reception unit
42 . . . Satellite orbit information acquisition unit
43 . . . Installation position information acquisition unit
44 . . . Azimuth mask generation unit
45 . . . Positioning and time synchronization processing unit
46 . . . Time information generation unit
47 . . . Position information generation unit

The invention claimed is:

1. A navigation satellite system reception apparatus for performing at least one of positioning processing or time synchronization processing with a navigation satellite based on a navigation satellite signal received from a plurality of navigation satellites, the navigation satellite system reception apparatus comprising:

an orbit information acquisition unit, implemented with one or more processors, configured to acquire orbit information of a navigation satellite of the plurality of navigation satellites;

a position information acquisition unit, implemented with one or more processors, configured to acquire position information of an installation position of the navigation satellite system reception apparatus;

an azimuth information acquisition unit, implemented with one or more processors, configured to acquire azimuth information of an azimuth perpendicular to a wall surface of an obstruction present adjacent to the navigation satellite system reception apparatus, wherein the azimuth information acquisition unit comprises a support base (i) fixed to the wall surface of the obstruction and supporting an antenna of the navigation satellite system reception apparatus at a position at a particular distance from the wall surface and (ii) protruding in a direction perpendicular to the wall surface of the obstruction and extends horizontally and an azimuth meter arranged on the support base and measuring the azimuth information perpendicular to the wall surface of the obstruction;

a mask region calculating unit, implemented with one or more processors, configured to calculate a mask region for selecting a navigation satellite of the plurality of navigation satellites to be a target of processing in the positioning processing or the time synchronization processing, based on the azimuth information, wherein the mask region is identical to or is included in a region on a side opposite to a region in an azimuth toward an open space side with respect to the wall surface of the obstruction with a boundary being both azimuths perpendicular to the azimuth toward the open space side with respect to the wall surface of the obstruction in polar coordinates with a center being the installation position of the navigation satellite system reception apparatus; and a navigation satellite signal processing unit, implemented with one or more processors, configured to:

calculate an azimuth and an angle of elevation of each of the plurality of navigation satellites with reference to the navigation satellite system reception apparatus based on the orbit information and the position information;

select a navigation satellite of the plurality of navigation satellites to be a target of processing based on the azimuth and the angle of elevation that are respectively calculated and the mask region; and perform at least one of the positioning processing or the time synchronization processing based on the navigation satellite signal received from the navigation satellite that is selected.

2. The navigation satellite system reception apparatus according to claim 1, wherein the mask region includes a boundary being defined by a threshold with respect to at least an azimuth in polar coordinates with a center being the installation position of the navigation satellite system reception apparatus.

3. The navigation satellite system reception apparatus according to claim 2, wherein the mask region includes a boundary being defined by a threshold with respect to an angle of elevation in polar coordinates with a center being the installation position of the navigation satellite system reception apparatus.

4. A navigation satellite signal processing method used in a navigation satellite system reception apparatus for performing at least one of positioning processing or time synchronization processing with a navigation satellite based on a navigation satellite signal received from a plurality of navigation satellites, the navigation satellite signal processing method comprising:

acquiring, by an orbit information acquisition unit, orbit information of a navigation satellite of the plurality of navigation satellites;

acquiring, by a position information acquisition unit, position information of an installation position of the navigation satellite system reception apparatus;

acquiring, by an azimuth information acquisition unit, azimuth information of an azimuth perpendicular to a wall surface of an obstruction present adjacent to the navigation satellite system reception apparatus, wherein the azimuth information acquisition unit comprises a support base (i) fixed to the wall surface of the obstruction and supporting an antenna of the navigation satellite system reception apparatus at a position at a particular distance from the wall surface and (ii) protruding in a direction perpendicular to the wall surface of the obstruction and extends horizontally and an azimuth meter arranged on the support base and measuring the azimuth information perpendicular to the wall surface of the obstruction;

calculating, by a mask region calculating unit, a mask region for selecting a navigation satellite of the plurality of navigation satellites to be a target of processing in the positioning processing or the time synchronization processing, based on the azimuth information, wherein the mask region is identical to or is included in a region on a side opposite to a region in an azimuth toward an open space side with respect to the wall surface of the obstruction with a boundary being both azimuths perpendicular to the azimuth toward the open space side with respect to the wall surface of the obstruction in polar coordinates with a center being the installation position of the navigation satellite system reception apparatus;

calculating, by a navigation satellite signal processing unit, an azimuth and an angle of elevation of each of the plurality of navigation satellites with reference to the navigation satellite system reception apparatus based on the orbit information and the position information;

selecting, by a navigation satellite signal processing unit, a navigation satellite of the plurality of navigation satellites to be a target of processing based on the azimuth and the angle of elevation that are respectively calculated and the mask region; and performing, by a navigation satellite signal processing unit, at least one of the positioning processing or the time synchronization processing based on the navigation satellite signal received from the navigation satellite that is selected.

5. A non-transitory computer-readable storage medium storing a navigation satellite signal processing program for causing one or more computer to function as the orbit information acquisition unit, the position information acquisition unit, the mask region calculating unit, and the navigation satellite signal processing unit according to claim 1.

* * * * *